Sept. 15, 1964  H. C. BRIEL, JR., ETAL  3,148,775
APPARATUS FOR FEEDING PARTS
Filed Aug. 30, 1962  3 Sheets-Sheet 1
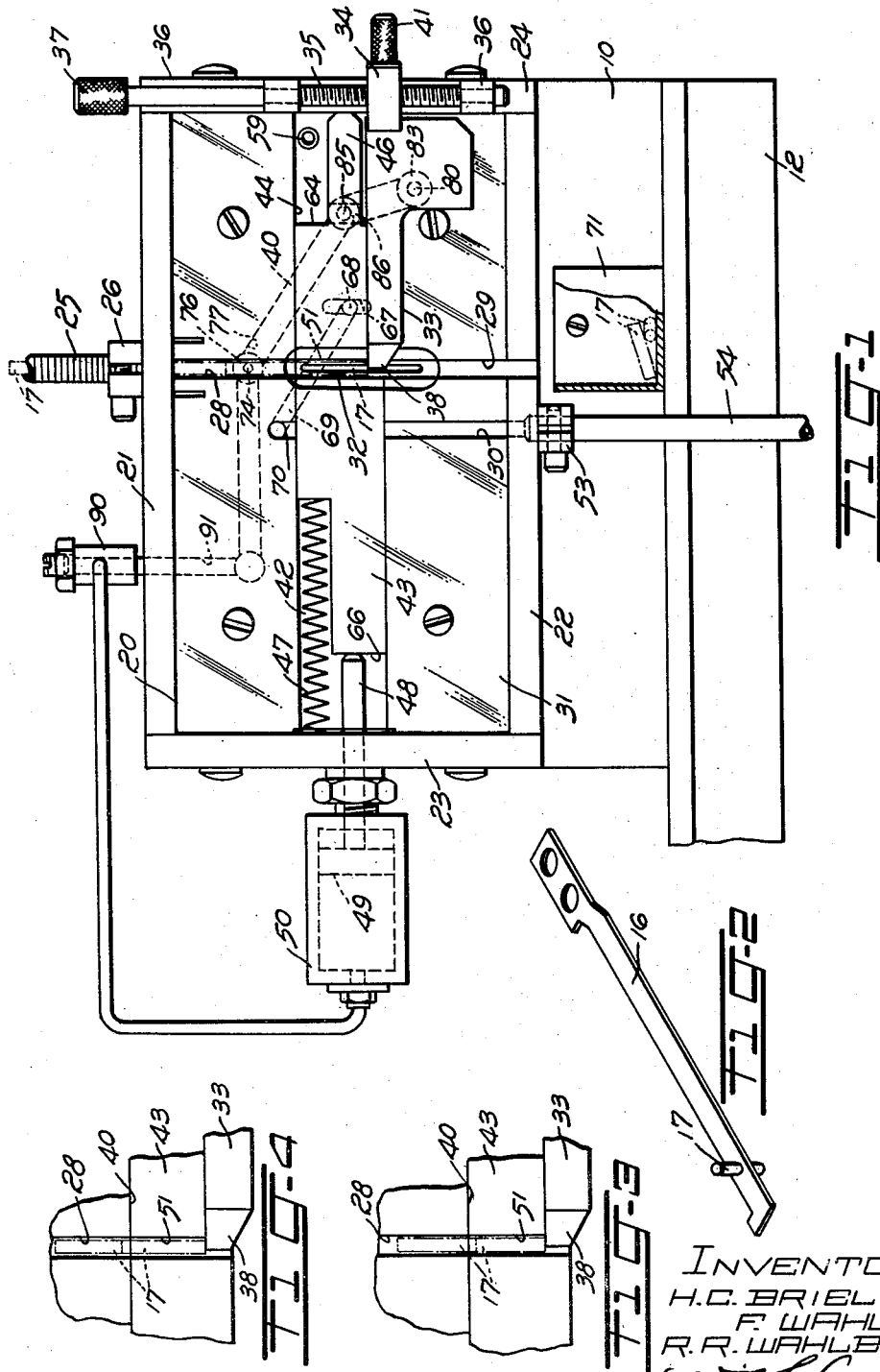
INVENTORS
H.C. BRIEL JR.
F. WAHL
R.R. WAHLBERG
BY W.J. Johnson
ATTORNEY

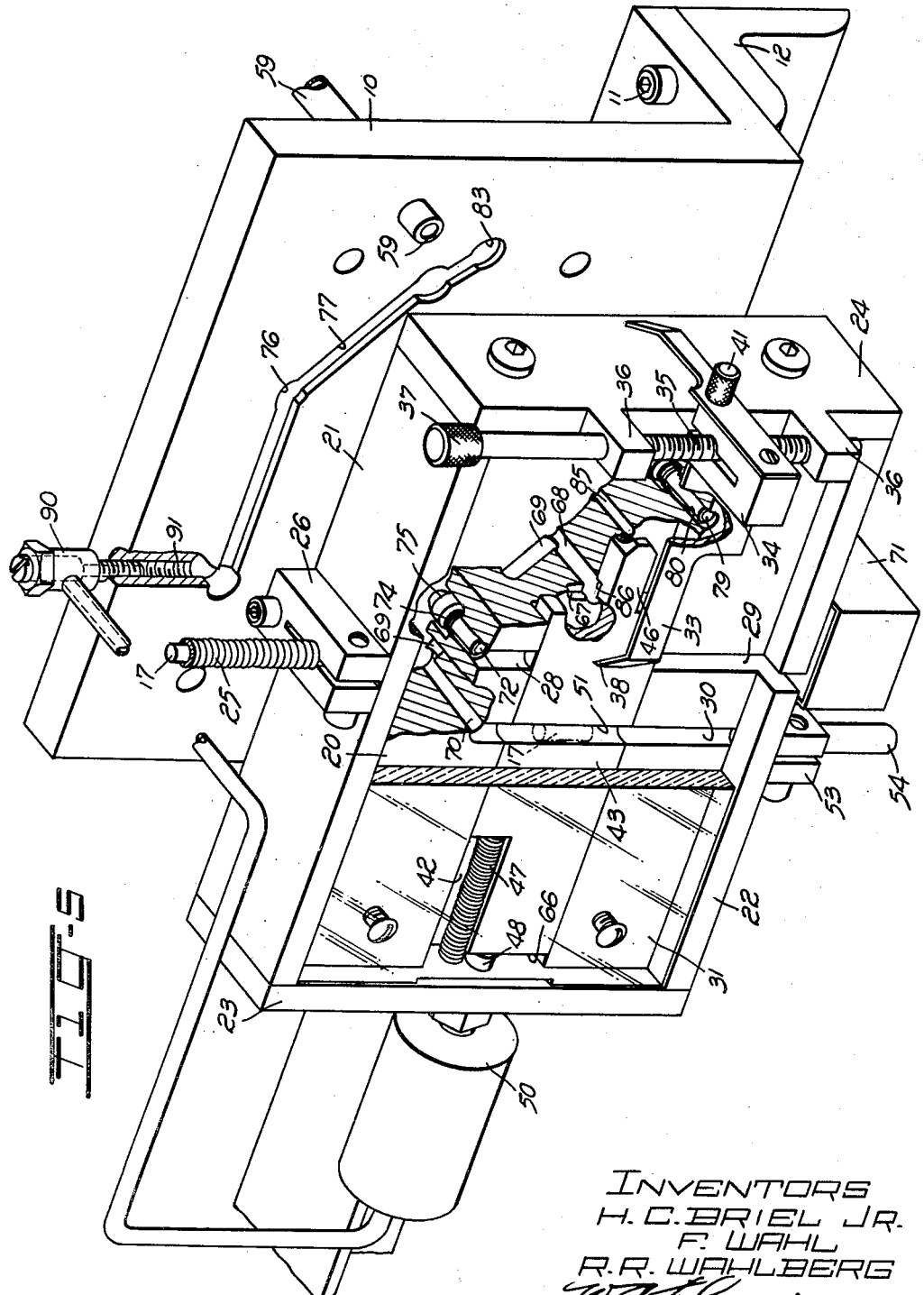

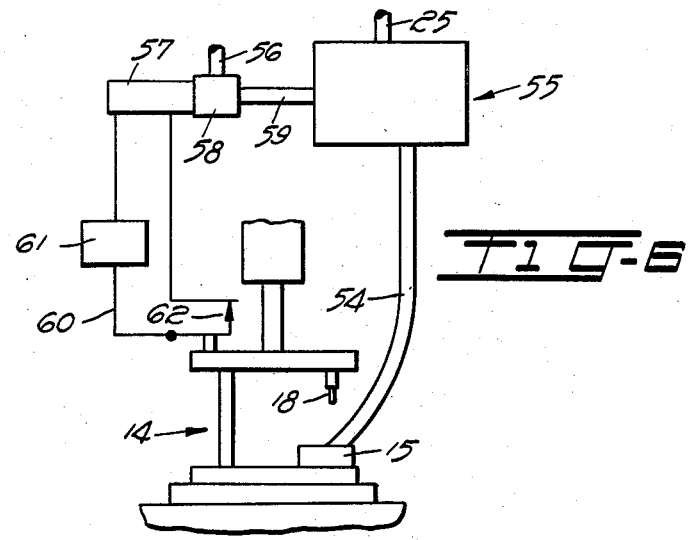
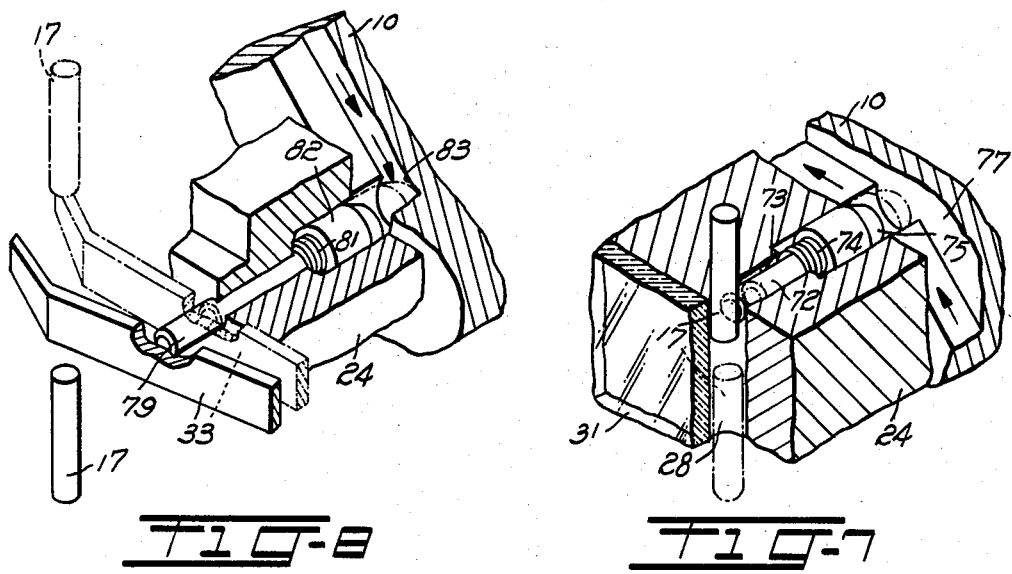

3,148,775
APPARATUS FOR FEEDING PARTS
Henry C. Briel, Jr., Rochelle Park, Frank Wahl, North Bergen, and Roger R. Wahlberg, Bloomfield, N.J., assignors to Western Electric Company, Incorporated, New York, N.Y., a corporation of New York
Filed Aug. 30, 1962, Ser. No. 220,503
13 Claims. (Cl. 209—82)

This invention relates to apparatus for feeding parts of given lengths to assembly units, particularly separators for relay springs.

In the manufacture of relays of certain types, hard rubber separators are used to space certain of the springs of relays relative to each other and to function in operation of the contacts. These separators are cut on automatic screw machines from rods which are 3 to 4 feet in length and after each cutting operation there is one part or separator which is shorter or longer than the given length of all of the other parts cut from the rod. It is advantageous to place these parts in a conventional vibrating feeder, which may hold parts cut from numerous rods and unless the parts of the undesired lengths are removed, these parts will be advanced from the feeder to an assembly unit. Attempts have been made to remove these undesired parts by hand, but it has been found that some are overlooked and in each instance, when the parts of the undesired lengths are fed to a press or an assembly unit for mounting the parts in springs, they result in jamming the assembly unit and causing loss of time during reconditioning of the unit.

An object of the present invention is an apparatus for receiving parts successively, feeding all parts of a given length to an assembly unit, and rejecting all parts not of the given length.

In accordance with the object, the apparatus for feeding parts comprises a body fixed to a support and having an inlet passageway, a reject passageway and a feed passageway, means to feed parts successively to the inlet passageway, means connecting the feed passageway to an assembly unit and a transfer element adapted to receive the successive parts, operable to move all parts of said given length to the feed passageway singly and held unoperable by parts not of said given length, the parts not of said given length being aligned with the reject outlet passageway.

Other objects and advantages will be apparent from the following detailed description when considered in conjunction with the accompanying drawing wherein:

FIG. 1 is a fragmentary elevational view of the apparatus;

FIG. 2 is an isometric view of a relay spring having a part of a given length mounted therein;

FIG. 3 is a fragmentary detailed view illustrating the presence of a part shorter than the given length in the apparatus;

FIG. 4 is similar to FIG. 3 showing the presence of a part longer than the given length in the apparatus;

FIG. 5 is an isometric view of the apparatus with the body moved away from its support and certain portions broken away to illustrate parts of the apparatus;

FIG. 6 is a schematic illustration of the apparatus shown with an assembly unit in a press;

FIG. 7 is an isometric fragmentary sectional view illustrating a holding means for parts when a preceding part is not of the given length; and FIG. 8 is a fragmentary isometric view illustrating the stop moving means when a part not of the given length is presented.

The apparatus includes a support 10, which is mounted at 11, on a bracket 12 at any convenient location with respect to a press indicated generally at 14 in FIG. 6 and having an assembly unit 15 to receive singly in any suitable manner springs 16 shown in FIG. 2, into which parts 17 of predetermined given lengths are to be mounted through the aid of any suitable tool such as that shown at 18 in FIG. 6. Returning to FIGS. 1 and 5, a body 20 is fixed to the support 10 in any suitable manner, and is provided with a top plate 21, a bottom plate 22 and end members 23 and 24. A flexible tube 25 fixed at 26 at its lower end to the top plate 21, has its upper end, not shown, connected to a conventional vibrating feeder to feed parts successively to the apparatus. The majority of these parts are of a given length depending upon the specifications required for the particular type of relay in which the parts or separators are to be used. The front face of the body 20 is provided with grooves 28, 29 and 30, which respectively are identified as an inlet passageway, a reject passageway, and a feed passageway. A transparent plastic cover 31, mounted on the front face of the body 20, crosses the adjacent open portions of these passageways, an elongated aperture 32 being provided in the cover 31 in the areas of the inlet passageway 28 and the reject passageway 29. A resilient adjustable stop 33 is carried by a split nut 34 mounted on a threaded shaft 35. The threaded shaft 35 is supported for rotation but held against axial movement in bearings 36 of the end member 24. Through the aid of a knurled end 37, the threaded shaft 35 may be rotated to raise or lower the stop 33 to vary the position of a supporting end 38 of the stop in the aperture 32 relative to a plane 40. The split nut 34 may be locked on the threaded shaft through the aid of a holding screw 41.

The plane 40 represents the lower end of the inlet passageway 28 and the upper surface of a groove 42 in which a piston-like slide or transfer element 43 is deposited. A pressure chamber 44, disposed at the right-hand of the groove 42, extends the full width of the body 20. This groove 42, rectangular in cross-section, is formed in the body, is of a given depth and extends the full length of the body where the ends are closed by the end members 23 and 24 and the front portion is closed by the cover 31. An integral projection 46 of the slide 43 serves as a stop when it is urged by a spring 47 and, in some instances, by a plunger 48 of a piston 49 in an air cylinder 50 against an end wall 54. The slide is provided with a passageway 51 normally aligned with the inlet passageway 28 and the reject passageway 29. However, each part located in the passageway 28 will, when allowed to enter the passageway 32, come to rest on the projection 38 of the stop 33 where its upper end, if of the given length, will be in the plane 40 locating the bottom end of the next part in that same plane so that the slide 43 may be moved longitudinally to the left to align the passageway 51 with the feed passageway 30. The feed passageway 30 has its lower end connected at 53 with a tube 54, which directs the parts of given lengths singly to the assembly unit 15 FIG. 6.

The apparatus, indicated generally at 55, FIG. 6, is operated successively by quantities of air under pressure from a supply line 56 when a solenoid portion 57 of a valve 58 is energized to allow these quantities of air under pressure to enter the apparatus through a line 59. In the present illustration, the solenoid 57 is in a circuit 60 with a source of electrical energy 61 and under the control of a normally open switch 62, which is closed by the press 14 during each movement of the press into the open position shown. In FIGS. 1 and 5, the line 59 is shown entering the pressure chamber 44, this pressure being applied against an end 64 of the slide 43. If a part 17, of said given length, has moved into the passageway 51 of the slide and is resting on the supporting end 38 of the resilient stop 33, the upper end of the part 17 will be in the plane 40 with the upper surface of the slide 43, permitting the slide to be moved to the left by the air under pressure in the chamber 44 to the end of the movement of the slide. This movement is controlled by the left end 66 of the slide abutting against the end member 23 or any suitable means serving as a stop for the slide. This action of the slide transfers the part 17 in the passageway 51 into alignment with the feed passageway 30 where the part is free to drop through the passageway 30 and the tube 54 to the assembly unit 15. When the slide is in this position, that is, in its farthest position to the left, the other end or surface 64 of the slide will open a recess 67 in the back wall of the groove 42 to the chamber 44. The recess includes an entrance end 68 of a passageway 69 extending to an outlet 70 positioned above the passageway 51 so that, during the feeding interval, air under pressure will be directed from the chamber 44, through the passageways 51 and 30 to force the part out of the slide and downwardly toward the assembly unit 15.

If a part 17 longer than the given length, is in the passageway 51 resting on the end of the stop 33, its upper end will extend into the passageway 28 as shown in FIG. 4, thus locking the slide 43 against movement by the air under pressure forced into the chamber 44. A similar result occurs when a part 17 is shorter than said given length when deposited in the passageway 51 of the slide 43 and resting on the portion 38 of the stop 33. In this instance, the part 17 following the shorter part will be allowed to move beyond the plane 40 and enter the passageway 51 of the slide, thus locking the slide against movement to the left by the air under pressure in the chamber 44. This pressure of air, in each instance, is not sufficient to cause a shearing action on the parts, which hold the slide 43 unoperable. However, this quantity of air under pressure is utilized to hold the parts in the passageway 28 against downward movement while another means causes movement of the resilient stop 33 outwardly to free the undesirable parts in each instance and allow them to drop through the reject passageway 29 and into a receptacle 71. The first means includes a holding plunger 72, disposed in an aperture 73, of the body in alignment with the passageway 28, urged outwardly away from the passageway 28 by a spring 74 and having a piston-like head 75 of the contour shown normally extending into a portion 76 of a passageway 77 cut into the support 10. The function of the plunger 72 is to engage any part 17 in the passageway 28 and hold it against downward movement until the pressure in the passageway 77 is reduced so that the spring 74 may function to move the holding plunger away from the part. A similar plunger 79 is deposited on an aperture 80 of the body 20, and positioned to engage the stop 33. In this instance, the plunger 79 is normally urged outwardly by a spring 81 away from the stop 33 to locate its piston-like head 82 in a portion 83 of the passageway 77 until pressure in the passageway 77 is sufficient to force the plunger 79 against the stop 33 to move the stop from the normal or broken line position shown in FIG. 8 to the solid line position where it will free the undesirable part and allow it to drop into the receptacle 71.

The passageway 77 is opened to the chamber 44 through a hole 85, which is uncovered by a groove 86 in the projection 46 of the slide, this hole being closed by the projection during movement of the slide 43 to the left during the presence of a part 17 of said given length in the passageway 51. However, if a part shorter or longer than said given length is present in the passageway 51, holding the slide 43 against movement by air under pressure in the chamber 44, the air under pressure in this chamber will be allowed to escape through the hole 85 and into the passageway 77 to cause actuation of the plungers 72 and 79, respectively, holding the part in the passageway 28 and moving the stop 33 free of the undesirable part in the passageway 51 allowing it to drop into the receptacle 71.

To relieve the binding action on the part during the existence of an undesirable part in the passageway 51 of the slide, which cannot be accomplished by the spring 47, the air under pressure passing from the chamber 44 through the passageway 77 to cause actuation of the plungers 72 and 79 is also utilized to operate the plunger 48. This air under pressure is allowed to pass through a valve 90, connected to the passageway 77 through line 91 and to the cylinder 50 so that the plunger 48 of the piston 49 will engage the surface 66 of the slide and apply the necessary force to the slide to remove the gripping action on the part extending partially in passageways 28 and 51. If the undesirable part in the passageway 51 is shorter than the given length, the gripping action will be on the next part above the undesirable part, the undesirable part having been freed to drop into the receptacle 71 upon movement of the stop 33 away from the passageway 51. In this instance, the stop 33 will be allowed to return to its normal position for the next part when released by the plunger 72 and the binding action thereon by the slide. A similar action occurs when the undesirable part is longer than said given length and is gripped between the passageways 28 and 51. When this gripping force is removed, this undesirable part will also drop through the passageway 29 and into the receptacle 71.

The valve 90 is a metering type of valve adjustable to slow down the action of the piston 49 and allow the slide 66 time to move when part 17 is of the proper length.

*Operation*

In the present arrangement with parts 17 being fed continuously to the tube 25 and through the tube into the passageway 28, the apparatus is under control of the press 14 or of the assembly unit means 15–18, whereby successive quantities of air under pressure are supplied to the chamber 44 of the apparatus to bring about the successive operations thereof. If all of the parts fed successively to the apparatus were of a given length, there would be repeated movements of the slide 43 between its normal position where the passageway 51 therein is aligned with the inlet passageway 28 and after its movement in alignment with the feed passageway 30 to successively feed the parts to the assembly unit 15 through the tube 54. However, to prevent parts not of the given length from being fed to the assembly unit 15, the apparatus is most efficient in stopping these parts in the passageway 51, holding the next part in the passageway 28 through actuation of the plunger 72 as illustrated in FIG. 7 and at the same time actuating the plunger 79 to move the stop 33 free of the undesirable part and allowing it to pass through the passageway 29 and into the receptacle 71. This is brought about by utilizing some of the air under pressure in each operating cycle that was intended for use in transferring the desirable parts in the slide from alignment with the inlet passageway 28 to align with the feed outlet 30. This action is made possible by adjustment of the stop 33, through its adjusting screw 35, to locate the upper end of the parts of said given length at the plane 40 permitting this movement of the slide against the force of the spring 47 and the plunger 48, which is free of any air under pressure in the cylinder.

When parts not of the given size are present in the passageway 51, bringing about the locking action illustrated in either FIG. 3 or 4, this same quantity of air which was to be utilized in moving the slide 43 is now utilized through the hole 85 and the passageway 77 in operating the part holding plunger 72, the stop moving plunger 79 and subsequently the plunger 48 to free the pinching or gripping action on the part at the juncture at the passageway 28 and 51, to free the gripped part thus conditioning the apparatus to go about its automatic action in feeding parts from the supply 25 to the assembly unit 15.

It is to be understood that the above described arrangements are simply illustrative of the application of the principles of the invention. Numerous other arrangements may be readily devised by those skilled in the art

What is claimed is:

1. An apparatus for feeding parts of a given length to an assembly unit comprising:
   a support mounted at a fixed position relative to the unit,
   a body fixed to the support and having an upper portion with an inlet passageway, and a lower portion spaced from the upper portion and having a reject outlet passageway aligned with the inlet passageway and a feed outlet passageway spaced from the reject outlet passageway,
   means connected to the inlet passageway of the upper portion to feed parts successively thereto including possibly parts not of said given length,
   means connecting the feed outlet passageway to the assembly unit, and
   a transfer element slidably disposed between the upper and lower portions of the body and adapted to receive the successive parts from the inlet passageway the transfer element being operable to move all parts of said given length to the feed outlet passageway singly and held unoperable by parts not of said given length to align the parts not of said given length with the reject outlet passageway.

2. An apparatus for feeding parts according to claim 1 in which:
   a stop is positioned adjacent the body and adapted to locate the lower extremity of each part in the transfer element, and
   means carried by the support and actuable to vary the position of the stop from the inlet passageway to position all parts of said given length in the transfer element clear of the inlet passageway for movement with the transfer element to the feed outlet passageway and cause blocking of the transfer element against movement by parts not of said given length not clearing the inlet passageway and holding of said last mentioned parts in alignment with the reject outlet passageway.

3. An apparatus for feeding parts of a given length to an assembly unit comprising:
   a support mounted at a fixed position relative to the unit,
   a body fixed to the support and having a laterally extending groove with top and bottom surfaces, an inlet passageway extending downwardly to said top surface, a reject passageway aligned with the inlet passageway and extending downwardly from said bottom surface and spaced from the reject outlet passageway,
   means connected to the inlet passaegway to feed parts successively thereto including possibly parts not of said given length,
   means connecting the feed passageway to the assembly unit,
   a transfer element movable in the groove between a start position and an operated position and having a passageway normally aligned with the inlet passageway to receive successive parts therefrom, and
   a movable stop carried by the body and adapted to enter the passageway in the transfer element to stop and support the successive parts entering the passageway of the transfer element and locate upper ends of all part of the given length in a plane with said upper surface of the groove and cause them to retain their immediately following parts in the inlet to free the transfer element for movement of said parts singly to the feed passageway.

4. An apparatus for feeding parts according to claim 3 in which:
   an air chamber is disposed in the body at one end of the groove, and
   means to force successive quantities of air under pressure into the chamber to operate the transfer element to transfer the parts of the given length successively from the inlet passageway to the feed passageway.

5. An apparatus for feeding parts according to claim 3 in which:
   an air chamber is disposed in the body at one end of the groove,
   means to force successive quantities of air under pressure into the chamber to operate the transfer element to transfer the parts of the given length successively from the inlet passageway to the feed passageway, and
   a series of air passageways normally closed by the transfer element and open when the successive parts of the given length are moved into alignment with the feed passageway to exhaust air from the chamber.

6. An apparatus for feeding parts according to claim 3 in which:
   an air chamber is disposed in the body at one end of the groove,
   means to force successive quantities of air under pressure into the chamber to operate the transfer element to transfer the parts of the given length successively from the inlet passageway to the feed passageway,
   a series of air passageways normally closed by the transfer element and open when the successive parts of the given length are moved into alignment with the feed passageway to exhaust air from the chamber, and
   utilize the exhausting air to force each part from the transfer element and through the feed passageway.

7. An apparatus for feeding parts according to claim 3 in which:
   an air chamber is disposed in the body at one end of the groove,
   means to force successive quanties of air under pressure into the chamber to operate the transfer element to transfer the parts of the given length successively from the inlet passageway to the feed passageway,
   the presence of a part not of the given length in the passageway of the transfer element causing holding of the transfer element against movement and maintaining of the passageway in the transfer element in alignment with the inlet passageway and the reject passageway, and
   means adapted to utilize some of the air under pressure from the chamber to move the stop free of the part to free it to drop through the reject passageway.

8. An apparatus for feeding parts according to claim 3 in which:
   an air chamber is disposed in the body at one end of the groove,
   means to force successive quantities of air under pressure into the chamber to operate the transfer element to transfer the parts of the given length successively from the inlet passageway to the feed passageway,
   the presence of a part not of the given length in the passageway of the transfer element causing holding of the transfer element against movement and maintaining of the passageway in the transfer element in alignment with the inlet passageway and the reject passageway,
   means adapted to utilize some of the air under pressure from the chamber to move the stop free of the part to free it to drop through the reject passageway, and
   means adapted to utilize some of the air under pressure from the chamber to hold the next part in the inlet passageway against downward movement until the part in the passageway of the transfer element is released.

9. An apparatus for feeding parts according to claim 3 in which:
  an air chamber is disposed in the body at one end of the groove,
  means to force successive quantities of air under pressure into the chamber to operate the transfer element to transfer the parts of the given length successively from the inlet passageway to the feed passageway,
  the presence of a part not of the given length in the passageway of the transfer element causing holding of the transfer element against movement and maintaining of the passageway in the transfer element in alignment with the inlet passageway and the reject passageway,
  means adapted to utilize some of the air under pressure from the chamber to move the stop free of the part to free it to drop through the reject passageway, and
  means adapted to utilize some of the air under pressure from the chamber to apply a counteracting force on the transfer element to free the part holding the transfer element against movement.

10. An apparatus for feeding parts according to claim 3 in which:
  an air chamber is disposed in the body at one end of the groove,
  means to force successive quantities of air under pressure into the chamber to operate the transfer element to transfer the parts of the given length successively from the inlet passageway to the feed passageway,
  a holding plunger positioned in the body normally free of the inlet passageway and actuable by air under pressure to hold a part in the inlet passageway, and
  an air passageway to the holding plunger closed to the chamber when the transfer element is operated and open to the chamber when the transfer element is held unoperated by the presence of a part not of the given length to utilize some of the air under pressure in the chamber to actuate the holding plunger.

11. An apparatus for feeding parts according to claim 3 in which:
  an air chamber is disposed in the body at one end of the groove,
  means to force successive quantities of air under pressure into the chamber to operate the transfer element to transfer the parts of the given length successively from the inlet passageway to the feed passageway,
  a stop moving plunger positioned in the body normally free of the stop and actuable by air under pressure to move the stop free of the part in the passageway in the transfer element, and
  an air passageway to the stop moving plunger closed to the chamber when the transfer element is operated and open to the chamber when the transfer element is held unoperated by the presence by a part not of the given length to utilize some of the air under pressure in the chamber to actuate the plunger to move the stop free of the part in the passageway of the transfer element.

12. An apparatus for feeding parts according to claim 3 in which:
  an air chamber is disposed in the body at one end of the groove,
  means to force successive quantities of air under pressure into the chamber to operate the transfer element to transfer the parts of the given length successively from the inlet passageway to the feed passageway,
  a holding plunger positioned in the body normally free of the inlet passageway and actuable by air under pressure to hold a part in the inlet passageway,
  a stop moving plunger positioned in the body normally free of the stop and actuable by air under pressure to move the stop free of the part in the passageway in the transfer element, and
  an air passageway to the plungers closed to the chamber when the transfer element is operated and open to the chamber when the transfer element is held unoperated by the pressure of a part not of the given length to utilize some of the air under pressure in the chamber to actuate the plungers.

13. An apparatus for feeding parts according to claim 3 in which:
  an air chamber is disposed in the body at one end of the groove,
  means to force successive qauntities of air under pressure into the chamber to operate the transfer element to transfer the parts of the given length successively from the inlet passageway to the feed passageway,
  a holding plunger positioned in the body normally free of the inlet passageway and actuable by air under pressure to hold a part in the inlet passageway,
  a stop moving plunger positioned in the body normally free of the stop and actuable by air under pressure to move the stop free of the part in the passageway in the transfer element.
  an air passageway to the plungers closed to the chamber when the transfer element is operated and open to the chamber when the transfer element is held unoperated by the pressure of a part not of the given length to utilize some of the air under pressure in the chamber to actuate the plungers,
  a unit operable by air under pressure to engage the end of the transfer element opposite the chamber to move the element to free a part extending partially in the inlet passageway of the body and the passageway of the element, and
  means connecting the unit to the air passageway to utilize some of the air under pressure from the chamber to operate the unit.

References Cited in the file of this patent
UNITED STATES PATENTS

| | | |
|---|---|---|
| 1,931,005 | Lafferty | Oct. 17, 1933 |
| 3,017,025 | Stephen | Jan. 16, 1962 |
| 3,064,808 | Fricke | Nov. 20, 1962 |